United States Patent [19]
Hayner

[11] 4,024,769
[45] May 24, 1977

[54] FLUID ACTUATED GYROSCOPE

[75] Inventor: Paul F. Hayner, Gilford, N.Y.

[73] Assignee: Sanders Associates, Inc., South Nashua, N.H.

[22] Filed: May 23, 1975

[21] Appl. No.: 580,266

[52] U.S. Cl. .................................. 74/5.12; 74/5.7
[51] Int. Cl.² ................. G01C 19/12; G01C 19/26
[58] Field of Search ...................... 74/5.1, 5.12, 5.7

[56] References Cited

UNITED STATES PATENTS

| | | | |
|---|---|---|---|
| 3,102,430 | 9/1963 | Boothroyd et al. | 74/5.7 |
| 3,287,982 | 11/1966 | Hayner et al. | 74/5.7 |
| 3,908,470 | 9/1975 | Evans et al. | 74/5.7 X |

*Primary Examiner*—Samuel Scott
*Assistant Examiner*—F. D. Shoemaker
*Attorney, Agent, or Firm*—Louis Etlinger; William L. Hunter

[57] ABSTRACT

A fluid actuated gyroscope having a hollow rotor provided with apertures defining nozzles through which compressed fluid within the housing flows to the interior of the rotor before being discharged. This flow causes the rotor to spin up to speed rapidly. Also described is a caging piston which, with its associated apparatus, performs the dual function of providing a passageway for venting the interior of the rotor during spin up and for caging and uncaging the gimbals.

32 Claims, 2 Drawing Figures

FLUID ACTUATED GYROSCOPE

FIELD OF THE INVENTION

This invention relates generally to gyroscopes and particularly to fluid actuated gyroscopes.

BACKGROUND

Fluid actuated gyroscopes have many practical applications but are particularly suitable for use in guidance systems of the single operational, or expendible, variety. Such gyroscopes should be of simple construction, inexpensive, and highly reliable. Rotation of the rotor must be initiated with-in a very short period of time (typically a fraction of a second) after the receipt of the signal, must come up to a high speed within a similar short period of time thereafter, and should sustain a useful speed for a relatively long period of time (typically 15 to 60 seconds). Both volume and weight should be kept as low as possible.

Many kinds of fluid actuated gyroscopes have been known and used in the past. One general kind is typified by the gyroscope described in the Hayner et al. U.S. Pat. No. 3,287,982. This patent describes a gyroscope having a fluid tight housing within which a hollow rotor is mounted for rotation. The rotor is formed with two or more orifices providing communication between the interior and exterior thereof. In operation, the entire case including the interior of the rotor is charged with gas under pressure. In order to actuate the gyroscope a means is provided for venting the case to the atmosphere whereupon the gas between the exterior of the rotor and the interior of the case escapes rapidly. The gas within the hollow rotor can excape only through the orifices which are located and shaped so that the reaction forces caused by the flow of fluid causes the rotor to be accelerated rapidly. One of the disadvantages of a gyroscope of this kind is that only that energy which is stored within the relatively small volume of the interior of the rotor is actually utilized in producing rotation.

Another kind of gyroscope which has been used in the past is typified by the unit described in the Boothroyd et al. U.S. Pat. No. 3,102,430. This patent describes a gyroscope having a gas tight housing, an outer gimbal within the housing, an inner gimbal within the outer gimbal, and a rotor mounted for rotation within the inner gimbal. The inner gimbal is hollow and of generally spherical shape. The rotor is provided with a number of impeller blades, or vanes, around its periphery. The inner gimbal is provided with a number of orifices adjacent to the rotor blades which orifices provide communication between the interior and the exterior of the inner gimbal. The entire case is charged with gas under pressure. In order to accelerate the rotor, the interior of the inner gimbal is vented to the atmosphere whereupon the remainder of the gas flows through the orifices in the inner gimbal and strikes the impeller blades of the rotor, accelerating it rapidly. This kind of gyroscope has a number of disadvantages. For example, after the rotor is brought up to speed, the impeller blades create a considerable amount of wind resistance thereby tending to declerate the rotor. Additionally, this gyroscope has a complicated venting and caging mechanism.

It is a general object of the present invention to provide a simplified and improved fluid actuated gyroscope.

SUMMARY OF THE INVENTION

Briefly stated, a gyroscope incorporating the present invention has a fluid tight housing, which, in operation, is charged with a fluid under pressure. Within the housing there is a hollow rotor provided with one or more apertures located and shaped to define curved nozzles so that the rotor is accelerated when fluid flows through the orifices from the exterior of the rotor to the interior thereof. A relatively simple mechanism combines the functions of venting the interior of the rotor and of caging and uncaging the mechanism. This arrangement allows the use of a smooth surfaced rotor which generates little friction while rotating. Additionally, very little stored energy is wasted since only the relatively small volume of fluid initially stored within the rotor escapes without imparting acceleration to the rotor.

More particularly, one embodiment of the invention comprises a housing capable of containing fluid having a pressure substantially greater than the ambient pressure, a hollow rotor, means for supporting the rotor within the housing for rotation, the rotor being formed with one or more apertures providing fluid communication between the interior and exterior thereof, wherein the apertures are located and shaped to define nozzles for urging the rotor to rotate upon the flow of fluid from the exterior of the rotor through the apertures to the interior thereof, and wherein there are included means defining a fluid passageway from the interior of the rotor to the exterior of the housing, means for blocking the passageway and means for unblocking the passageway.

DESCRIPTION OF PREFERRED EMBODIMENT

Figure 1:
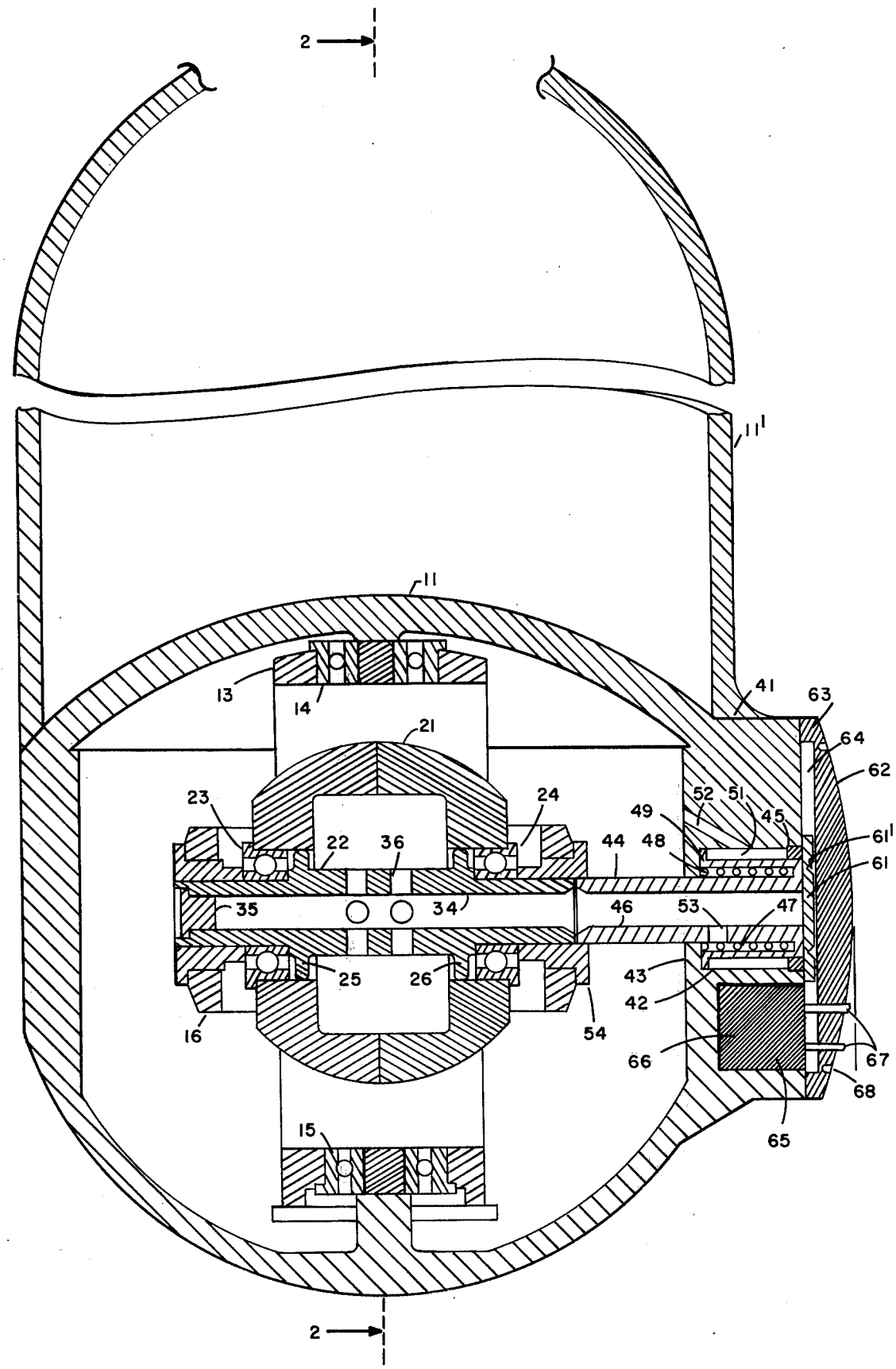
Figure 2:
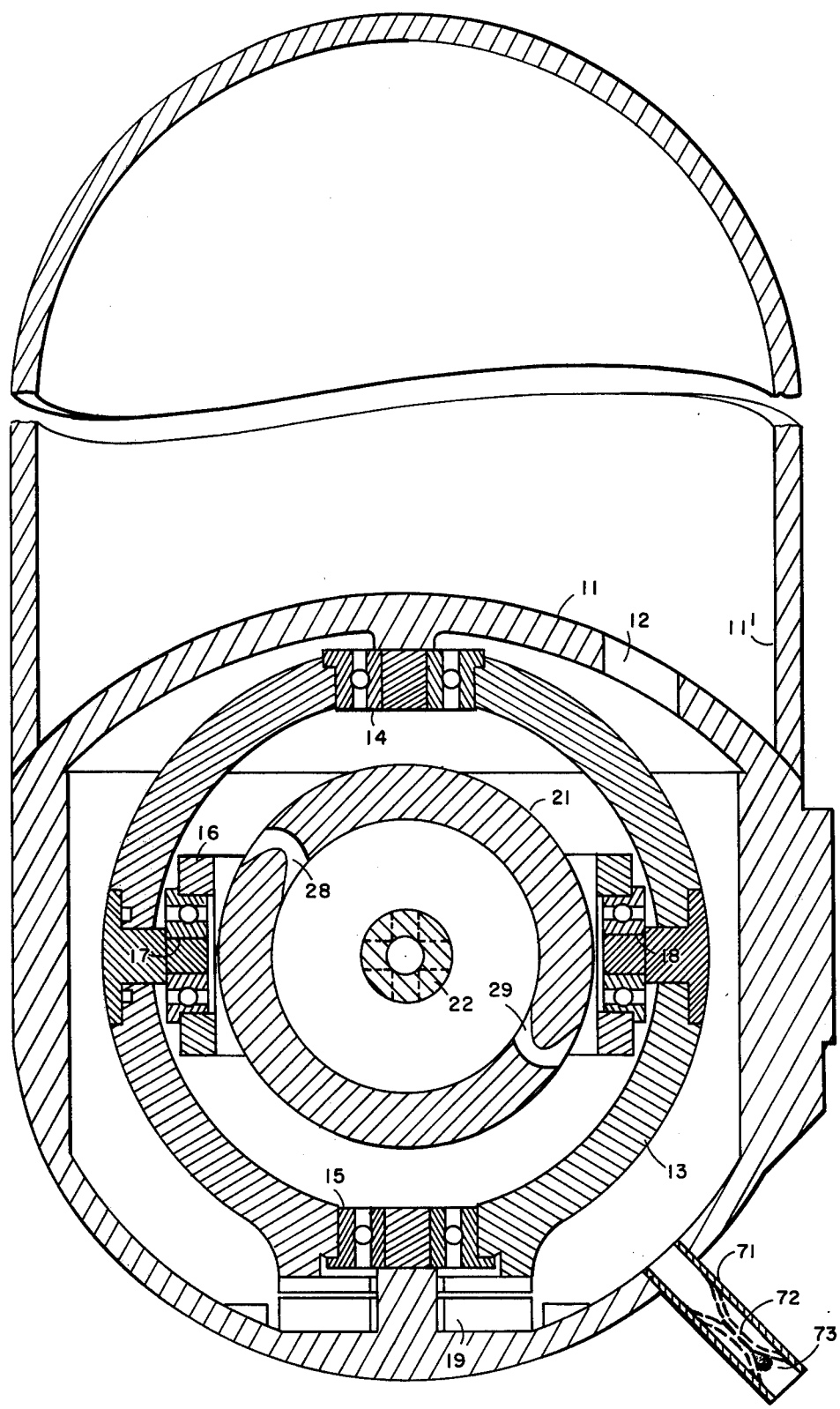

For a clearer understanding of the invention reference may be made to the following detailed description and the accompanying drawing in which:

FIG. 1 is a schematic cross sectional view of a gyroscope incorporating the invention; and FIG. 2 is a schematic cross sectional view taken along the line 2—2 of FIG. 1.

Referring now to the drawing, there is shown a housing 11 which encloses and supports the mechanism. The housing 11 is fluid tight, except for openings to be described hereinafter, and is strong enough to contain a fluid at a substantial pressure, for example dry nitrogen at a pressure of about 2,000 pounds per square inch or about 140 kilograms per square centimeter. The housing 11 may comprise only the main portion which more or less closely surrounds the mechanism but alternatively may also include an auxiliary portion, illustrated in the drawing as dome shaped and designated by the reference character 11', to enable a greater quantity of fluid under pressure to be stored. The size of the auxiliary portion, if included, is determined by the space available and the amount of power required. If included, there must of course be communication between the portions, for example by means of one or more passageways 12.

A generally ring shaped outer gimbal 13 is mounted within and rotatably supported by the housing 11 by means of bearings 14 and 15. A generally ring shaped inner gimbal 16 is mounted within and rotatably supported by the outer gimbal 13 by means of bearings 17 and 18. A pick-off device 19, such as a potentiometer, is provided to generate a signal indicative of the position of the outer gimbal 13 relative to the housing 11.

A generally spherical hollow rotor 21 is journalled for rotation about a shaft 22 by means of bearings 23 and 24. Adjacent to and axially inward from the bearings 23 and 24, the shaft 22 is formed to include two narrow, annular, enlarged diameter portions 25 and 26 which extend axially toward but are spaced from the rotor 21 by a clearance which is just large enough to permit free rotation at the rotor 21 but small enough to provide a low leakage labyrinth seal between the interior and exterior of the rotor.

As shown in FIG. 2, the rotor 21 is formed with at least one and preferably two or more apertures such as apertures 28 and 29 symmetrically spaced around the circumference of the rotor and located approximately in the plane through the center of the rotor perpendicular to the axis of the shaft 22. Each aperture is formed to define a curved nozzle so that as fluid flows from the exterior of the rotor to the interior, reaction forces are generated causing rapid angular acceleration of the rotor.

The shaft 22 is ridigly fastened at each end to the inner gimbal 16. The shaft 22 is provided with an axial bore 34 extending completely therethrough. The bore is closed at one end, the left end as shown in FIG. 1, for example by means of a cap 35. The other end of the bore is open. The shaft 22 is provided with one or more holes, such as the hole 36, providing fluid communication between the interior of the rotor 21 and the bore 34 of the shaft 22.

The housing 11 includes an enlarged portion 41 having a central opening 42 extending completely therethrough and of substantially uniform cylindrical shape except for an inwardly extending annular flange 43 at the interior portion of the housing. A tubular caging piston 44 is inserted into the opening 42 from the outside after which an insert 45 is shrink fitted into the outer portion of the opening. The caging piston 44 has an axial bore 46 open at both ends. The portion of the piston 44 within the opening 42 is in effect turned outward and back along itself thereby defining an annular space 47 between its own walls and which contains a spring 48. As shown in the drawing, the spring 48 bears at one end on the turned back portion of the piston 46 and at the other end on the flange 43 thereby urging the piston 44 outward, that is, to the right as viewed in FIG. 1. The turned back portion has an outwardly extending flange 49 of such external diameter as to make a sliding fit with the interior of opening 42. The overall length of the turned back portion is such that this flange 49 engages the flange 43 while the outer end of the piston 46 is approximately flush with the exterior of the enlarged portion 41 of the housing 11. The main protion of the piston 44 is of such external diameter as to make a sliding fit with the interior diameter of the flange 43. The exterior diameter of the turned back portion is smaller than the diameter of the opening 42 thereby defining an annular chamber 51. The enlarged portion 41 of the housing 11 has one or more passageways 51 providing fluid communication between the chamber 51 and the interior of the housing. The caging piston 44 also has one or more vent holes 53 providing fluid communication between the bore 46 and the space 47.

As shown in FIG. 1, a bushing 54 is fitted into the inner gimbal 16 and surrounds the open end of the shaft 22 the end of which is within the bushing 54 leaving an annular recess into which the inner end of the caging piston 44 extends far enough to substantially abut the open end of shaft 22. The bushing 54 constitutes a labyrinth seal between the interior of the housing 11 and the bores 34 and 46 of shaft 22 and piston 44.

As previously mentioned, the enlarged diameter portions 25 and 26 of the shaft 22 constitute labyrinth seals between the interior and the exterior of the rotor 21. The fit between the flange 43 and the piston 44 constitutes a labyrinth seal between the interior of the housing 11 and the annular space 47. The bushing 54 constitutes a labyrinth seal between the interior of the housing 11 and the bores 34 and 46. Prior to actuation of the gyroscope, when the entire housing is pressurized, the pressure is equal on both sides of all of these seals and there is no tendency for fluid to flow through them. It is only during spin up, when the interior of the rotor is vented to the ambient environment, as will be more fully explained, that a pressure difference exists across the seals and it is only during this time (typically a fraction of a second) that the sealing effect is needed.

As can be seen from FIG. 1, the arrangement just described provides a fluid passageway from the interior of the rotor 21, through the hole 36, and through the bore 34 to the bore 46. Additionally, it can be seen that with the piston 44 in the position shown, there is nothing at the inner end of the piston 44 and at the gimbal 16 to prevent axial movement of the piston 44 away from the shaft 22 and the gimbal 16, that is, to the right as viewed in FIG. 1. However, lateral motion is prevented. In the position of the parts shown, neither the inner gimbal nor the outer gimbal 13 can rotate. In other words, the gyroscope is caged until the piston 44 is withdrawn, as will be more fully explained. At the same time, the piston 44 serves as a portion of the passageway by which the interior of the rotor is vented.

A plate-like diaphragm 61 covers the opening 42 and is fastened to the enlarged portion 41 of the housing 11 with a strong, fluid tight seal, for example by electron beam welding. The diaphragm 61 has an annular notch or groove 61' in its surface to provide a preferred location of fracture upon actuation of the gyroscope. The spring 48 urges the piston 44 into engagement with the diaphragm 61.

A generally flat disc shaped cap 62 includes a peripheral flange 63 surrounding a central recess 64. The cap 63 covers the opening 42 and supports and reinforces the diaphragm 61 and is fastened at its flange 63 to the enlarged portion 41 of the housing 11, preferably by electron beam welding. The diaphragm 61 and the cap 62 constitute a closure which blocks the opening 42 and the bore 46 thereby sealing the interior of the housing 11 from the ambient environment. The cap 62 covers the entire opening 42 and the diaphragm 61 and extends a significant distance beyond these items. At one side of the opening 42, the enlarged portion 41 has an exterior recess 65 open to the exterior of the housing but covered by the cap 62. This recess contains an explosive charge 66, often called a squib. A pair of insulated wires 67 pass through the cap 62 so that a suitable signal may be applied thereto when it is desired to detonate the squib 66. The cap 62 is formed with an annular groove 68 adjacent to the outer periphery of the recess 64. The groove 68 is for the purpose of controlling the location of the fracture of the cap 62 when the squib is detonated.

As shown in FIG. 2, a filling tube 71 extends through the housing 11 to enable the interior of the housing to be charged with fluid, such as air or dry nitrogen, under substantial pressure such as 2,000 pounds per square inch or 140 kilograms per square centimeter. The tube 71 could contain a check valve but preferably, when the gyroscope is to be used but once, it comprises a pinch tube made of a malleable material such as copper or aluminum. After charging, the tube 71 is pinched, as shown by the dotted lines, with sufficient pressure to flatten and, in effect, weld the opposite inner surfaces together, as shown at 72, into a strong, fluid tight seal. A globule 73 of solder in the end of the tube seals any possible remaining pin holes.

It will be understood that the drawing is somewhat schematic, is not necessarily to scale, and that some parts shown as single pieces may, for convenience in manufacture and/or assembly, be made in two or more pieces, and vice-versa. Similarly, most of the conventional fasteners such as screws, rivets, welds and the like have been omitted in the interest of simplification.

In operation, the parts are positioned as shown in the drawing and the interior of the housing is charged through the pinch tube 71. Pressure fills the entire interior of the housing 11 including the interior of the rotor, which it reaches through the apertures 28 and 29, and the bore 34 of the shaft 22 and the bore 46 of the piston 44. The passageway 52 also allows the gas to pressurize the chamber 51. The vent hole 53 allows the gas to enter the chamber 47. The left end of the piston 44 is in the recess in the bushing 54 where it is held because the right end engages the diaphragm 61. The diaphragm 61 in turn is held in place by the cap 62. Therefore, the parts remain in the positins shown and neither the gimbal 13 nor the gimbal 16 can rotate. The gyroscope may be stored in this condition for a long period of time, such as five years.

When it is desired to actuate the gyroscope, a suitable signal is applied to the wires 67 whereupon the squib 66 is detonated. The gases thereby generated enter the recess 64 and fracture the cap 62 along the groove 68. This removes the support from the diaphragm 61 which ruptures from the internal pressure and breaks at its fracture notch 61'. A passageway is thereby opened from the interior of the rotor 21 through the holes 36, the bores 34 and 46 to the exterior of the housing 11 thereby quickly depressurizing the interior of the rotor and creating a pressure differential across the apertures 28 and 29. The flow of fluid through these apertures creates a strong reaction force which brings the rotor rapidly up to speed, typically in about 200 milli-seconds. During this time it is noted that, although the cap 62 and the diaphragm 61 are no longer in place, the piston 44 remains in its gimbal caging position because the space 47 has been depressurized through the vent hole 53 while the pressure in the chamber 51, acting between the insert 45 and the flange 49, is sufficient to overcome the urging of the spring 48 and to hold the piston 44 in place as long as there is substantial pressure within the interior of the housing. When the pressure within the housing 11 and the chamber 51 drops to that of the space 47, or ambient pressure, all of the stored energy will have been expended and the rotor will have been brought up to operating speed. Such pressure equalization allows the spring 48 to retract the piston 44 thereby uncaging the gimbals 13 and 16. The gyroscope is now in operation and useful signals can be extracted therefrom by means of the output potentiometer 19.

From the foregoing it can be seen that Applicant has provided a greatly improved fluid actuated gyroscope. Only that portion of the power represented by the fluid within the rotor and within the bores of the shaft and the caging piston are expelled without doing useful work. The piston 44 and its associated apparatus perform the combined functions of providing a passageway for venting the interior of the rotor and for caging and uncaging the gimbals. The rotor is smooth and free from exterior vanes so that very little wind friction is generated during its rotation. The mechanism is flexible in that as little or as much as necessary can be provided by adjusting the size of the auxiliary housing.

Although a preferred embodiment to the invention has been describe in considerable detail for illustrative purposes, many modifications will occur to those skilled in the art. If is therefore desired that the protection afforded by Letters Patent be limited only by the true scope of the appended claims.

What is claimed is:

1. A fluid actuated gyroscope, comprising, a housing capable of containing a fluid having a pressure substantially greater than the ambient pressure, a hollow rotor, means for supporting said rotor within said housing for rotation, said rotor being formed with an aperture providing fluid communication between the interior and exterior thereof, characterized in that said aperture is located and shaped to define a nozzle for urging said rotor to rotate in response to the flow of fluid from the exterior of said rotor through said aperture to the interior thereof, and in that there are included means defining a fluid passageway isolated from the interior of said housing and extending from the interior of said rotor to the exterior of said housing, means for blocking said passageway, and means for unblocking said passageway.

2. A fluid actuated gyroscope in accordance with claim 1 in which the exterior of said rotor is of generally spherical shape.

3. A fluid actuated gyroscope in accordance with claim 1 in which said rotor is formed to define at least one additional aperture similar to the aforesaid aperture.

4. A fluid actuated gyroscope in accordance with claim 1 in which said means for supporting said rotor includes a shaft on which said rotor is journalled.

5. A fluid actuated gyroscope in accordance with claim 4 in which said shaft has an axially extending bore closed at one end and open at the other end and which shaft also includes a generally radially extending hole providing fluid communication between the interior of said rotor and said bore.

6. A fluid actuated gyroscope in accordance with claim 5 which also includes a hollow piston having a bore open at both ends and which piston is positioned in axial alignment with said shaft adjacent said open end of said shaft.

7. A fluid actuated gyroscope in accordance with claim 6 in which said housing is formed to define an opening extending completely therethrough into which said piston extends, whereby said fluid passageway includes said hole, said bore of said shaft and said bore of said piston.

8. A fluid actuated gyroscope in accordance with claim 7 in which said means for blocking includes a closure for blocking the opening in said housing and said bore of said piston so as to seal the interior of said housing from the ambient environment.

9. A fluid actuated gyroscope in accordance with claim 8 in which said closure includes a diaphragm covering both said opening and the end of said piston within said opening and engaging said housing and also includes a generally flat cap covering and supporting and reinforcing said diaphragm and extending beyond said diaphragm and engaging said housing.

10. A fluid actuated gyroscope in accordance with claim 9 in which said means for unblocking includes a squib, detonatable in response to a singal, for fracturing said cap.

11. A fluid actuated gyroscope in accordance with claim 10 in which said cap is formed with a peripheral flange surrounding a recessed portion with said recessed portion overlying said diaphragm and said flange engaging said housing.

12. A fluid actuated gyroscope in accordance with claim 11 in which said housing is formed with an external recess beneath said cap in which said squib is positioned.

13. A fluid actuated gyroscope in accordance with claim 12 in which said cap is formed with an annular groove for controlling the location of the fracture of said cap by said squib.

14. A fluid actuated gryoscope in accordance with claim 13 including a spring for urging said piston toward engagement with said diaphragm and away from engagement with said shaft.

15. A fluid actuated gyroscope in accordance with claim 14 in which said piston and said housing in the region of said opening are formed to define a chamber in communication with the interior of said housing and shaped so that fluid pressure communicated to said chamber from the interior of said housing opposes the action of said spring and urges said piston towards engagement with said shaft.

16. A fluid actuated gyroscope in accordance with claim 15 which also includes a filling tube mounted on said housing and coupling the interior and exterior thereof to permit charging the interior with fluid under pressure.

17. A fluid actuated gryoscope in accordance with claim 1 which also includes an outer gimbal mounted within and supported for rotation by said housing, an inner gimbal mounted within and supported for rotation by said outer gimbal, and in which said means for supporting said rotor includes a shaft on which said rotor is journalled and which is fixedly supported by said inner gimbal.

18. A fluid actuated gyroscope in accordance with claim 17 in which the exterior of said rotor is of generally spherical shape.

19. A fluid actuated gyroscope in accordance with claim 17 in which said rotor is formed with at least one auxiliary aperture similar to the aforesaid aperture.

20. A fluid actuated gyroscope in accordance with claim 17 in which said shaft is formed with an axially extending bore, closed at one end and open at the other, and in which said shaft includes at least one generally radially extending hole providing fluid communication between the interior of said rotor and said bore.

21. A fluid actuated gyroscope in accordance with claim 20 which also includes a caging piston having an axial bore open at both ends and which piston is positioned in axial alignment with said shaft adjacent said open end of said shaft and in which said fluid passageway includes said hole, said bore of said shaft and said bore of said caging piston.

22. A fluid actuated gyroscope in accordance with claim 21 in which said inner gimbal adjacent said open end of said shaft includes means for receiving one end of said caging piston so as to permit axial movement thereof while preventing relative lateral movement between said piston and said inner gimbal.

23. A fluid actuated gyroscope in accordance with claim 22 in which said inner gimbal, adjacent to said open end of said shaft, is provided with a recess for embracing said caging piston.

24. A fluid actuated gyroscope in accordance with claim 23 in which said means for blocking includes a closure for blocking said opening in said housing and said bore of said piston so as to seal the interior of said housing from the ambient environment.

25. A fluid actuated gyroscope in accordance with claim 24 in which said closure includes a diaphragm covering the other end of said piston and engaging said housing and also includes a generally flat cap covering said diaphragm and extending beyond the periphery thereof and engaging said housing.

26. A fluid actuated gyroscope in accordance with claim 25 in which said means for unblocking includes an explosive charge, detonatable in response to a signal, for fracturing said cap.

27. A fluid actuated gyroscope in accordance with claim 26 in which said cap is formed with a peripheral flange surrounding a recessed portion with said recessed portion overlying said diaphragm and with said flange engaging said housing.

28. A fluid actuated gyroscope in accordance with claim 27 in which said housing is formed with an external recess beneath said cap in which said explosive charge is positioned.

29. A fluid actuated gyroscope in accordance with claim 28 in which said cap is formed with an annular groove for controlling the location of the fracture of said cap by said charge.

30. A fluid actuated gyroscope in accordance with claim 29 which also includes a spring for urging said caging piston into engagement with said diaphragm and out of engagement with said inner gimbal and said shaft.

31. A fluid actuated gyroscope in accordance with claim 30 in which said caging piston and said housing in the region of said opening are formed to define a chamber in communication with the interior of said housing and shaped so that fluid pressure communicated to said chamber from the interior of said housing opposes the action of said spring and urges said piston towards engagement with said inner gimbal and said shaft.

32. A fluid actuated gyroscope in accordance with claim 31 which also includes a filling tube mounted on said housing and coupling the interior and exterior thereof to permit charging the interior with fluid under pressure.

* * * * *